(12) United States Patent
Na et al.

(10) Patent No.: US 8,625,942 B2
(45) Date of Patent: Jan. 7, 2014

(54) EFFICIENT SILICON-ON-INSULATOR GRATING COUPLER

(75) Inventors: Yun-Chung N. Na, Palo Alto, CA (US); Haisheng Rong, Fremont, CA (US)

(73) Assignee: Intel Corporation, Santa Clara, CA (US)

( * ) Notice: Subject to any disclaimer, the term of this patent is extended or adjusted under 35 U.S.C. 154(b) by 247 days.

(21) Appl. No.: 13/075,949

(22) Filed: Mar. 30, 2011

(65) Prior Publication Data

US 2012/0250007 A1    Oct. 4, 2012

(51) Int. Cl.
G02B 6/34    (2006.01)
G02B 6/26    (2006.01)
G02B 6/42    (2006.01)

(52) U.S. Cl.
USPC .................. 385/37; 385/14; 385/15; 385/27; 385/28; 385/31; 385/39; 385/43

(58) Field of Classification Search
USPC ............................................. 385/28, 37, 43
See application file for complete search history.

(56) References Cited

U.S. PATENT DOCUMENTS

| | | | |
|---|---|---|---|
| 5,208,882 A | 5/1993 | Strasser et al. | |
| 6,381,380 B1 | 4/2002 | Forrest et al. | |
| 8,098,969 B2 * | 1/2012 | Tolstikhin et al. | 385/14 |
| 2002/0097941 A1 | 7/2002 | Forrest et al. | |
| 2005/0194990 A1 * | 9/2005 | Gothoskar et al. | 324/765 |
| 2009/0290837 A1 * | 11/2009 | Chen et al. | 385/37 |

FOREIGN PATENT DOCUMENTS

KR    10-0803288    2/2008

OTHER PUBLICATIONS

Kunstmaan, "Silicon photonics", http://www.imec.be/ScientificReport/SR2009/HTML/1213327.html, 7 pages.
Roelkens, G. et al., "High efficiency diffractive grating couplers for interfacing a single node optical fiber with a nanophotonic silicon-on-insulator waveguide circuit", Applied Physics Letters 92, 131101 (2008), 3 pages.
Roelkens, G. et al., "High efficiency Silicon-on-Insulator grating coupler based on a poly-Silicon overlay", Nov. 27, 2006/ vol. 14, No. 24/ Optics Express 11622, 9 pages.
Van Laere, Frederik et al., "Compact and Highly Efficient Grating Couplers Between Optical Fiber and Nanophotonic Waveguides", Journal of Lightwave Technology. vol. 25, No. 1, Jan. 2007, 6 pages.
Alonso-Ramos, C. et al., Efficient Fiber-to-chip Grating Coupler for Micrometric SOI Rib Waveguides, vol. 18, No. 14/ Optics Express, Jul. 5, 2010.
International Search Report and Written Opinion from PCT/US012/024073, mailed Sep. 26, 2012, 10 pages.

* cited by examiner

*Primary Examiner* — Ryan Lepisto
(74) *Attorney, Agent, or Firm* — Blakely, Sokoloff, Taylor & Zafman LLP

(57) ABSTRACT

An efficient grating coupler for a semiconductor optical mode includes a tapered edge to couple light between waveguide modes constrained by differing waveguide thicknesses. An optical circuit or laser has a waveguide in a rib or strip waveguide section that is of different height (e.g., having different vertical constraints) than a waveguide section that has a grating coupler through which light passes off-circuit. The tapered edge can couple light between the two waveguide sections with very low loss and back-reflection. The low loss and minimal back-reflection enables testing of the photonics circuit on a wafer level, and improved performance through the grating coupler.

19 Claims, 9 Drawing Sheets

US 8,625,942 B2

EFFICIENT SILICON-ON-INSULATOR GRATING COUPLER

FIELD

Embodiments of the invention are generally related to optics for computing devices, and more particularly to a grating coupler for a semiconductor laser.

COPYRIGHT NOTICE/PERMISSION

Portions of the disclosure of this patent document may contain material that is subject to copyright protection. The copyright owner has no objection to the reproduction by anyone of the patent document or the patent disclosure as it appears in the Patent and Trademark Office patent file or records, but otherwise reserves all copyright rights whatsoever. The copyright notice applies to all data as described below, and in the accompanying drawings hereto, as well as to any software described below: Copyright©2011, Intel Corporation, All Rights Reserved.

BACKGROUND

There is a significant increase in the use of optics in computing systems. Semiconductor photonics are increasingly used to meet the increased use of optics. Semiconductor photonics can be integrated on an integrated circuit (I/C) with known processing techniques. The resulting photonic I/Cs (PIC) have a small form factor, and can be integrated into circuits for use in telecommunication and data communication, biomedical devices, bio-sensing systems, gaming systems, and other uses.

There has been an interest in the use of silicon-based photonics (Si photonics) because of the fact that Si photonics materials processing is compatible with standard CMOS (complementary metal-oxide semiconductor) fabrication techniques and equipments. The pervasive use and knowledge of silicon processes allows for the design and manufacture of very compact Si photonics devices with current techniques.

However, coupling light into and out of sub-micron semiconductor devices such as silicon-on-insulator (SOI) PICs with high efficiency is difficult because of a small waveguide mode size and attendant large optical beam divergence. Current techniques involve the use of a surface grating coupler (GC) formed by periodically etching a SOI waveguide, so light can then be coupled out of the plane of the planar PICs. Unlike edge coupling where polished optical facets of singulated devices (e.g., dies) are required, the use of GCs allows access to the devices from the wafer surface and therefore enables wafer-level testing and characterization, which is essential for high-volume manufacture demand.

A major drawback with GCs is that their coupling efficiency is typically lower than that of an edge coupling method. GCs may be more efficient at certain processing thicknesses than at others. For example, traditional GC designs have relatively high efficiency when coupling to a 220 nm SOI platform, but the efficiency decreases rapidly with increasing SOI thickness. Given that a preferred integration platform for SOI PICS is based on a 400 nm thickness, the coupling efficiency of the GC is significantly reduced.

Additionally, conventional GC designs usually feature high back-reflection as a result of the enhancement of coupling efficiency by a deep etch into the SOI. The back-reflection can easily cause instability when operating a integrated laser, as well as causing uncertainties in measuring device spectral responses. Traditionally, when light propagates in the waveguide and reaches the GC region, it gets scattered by the periodic structures of GC. Some scattered power is directed out of the waveguide plane as desired, and some is scattered downwards into the substrate and lost.

Therefore, traditional coupling efficiency as determined by the power scattered into the substrate is usually limited to a maximum of −3 dB. However, factoring in other loss mechanisms such as fabrication imperfections and mode mismatch between GC and coupling fiber usually results in a typically achievable coupling efficiency of less than −6 dB.

BRIEF DESCRIPTION OF THE DRAWINGS

The following description includes discussion of figures having illustrations given by way of example of implementations of embodiments of the invention. The drawings should be understood by way of example, and not by way of limitation. As used herein, references to one or more "embodiments" are to be understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive.

Descriptions of certain details and implementations follow, including a description of the figures, which may depict some or all of the embodiments described below, as well as discussing other potential embodiments or implementations of the inventive concepts presented herein. An overview of embodiments of the invention is provided below, followed by a more detailed description with reference to the drawings.

DETAILED DESCRIPTION

As provided herein, an efficient grating coupler includes a tapered edge to couple light between waveguide modes constrained by differing waveguide thicknesses. The optical circuit or laser includes a rib or strip waveguide section that has a waveguide mode in an active region that has different vertical constraints than a waveguide mode in the grating coupler. The tapered edge is included at the end of the rib waveguide section interfacing between the rib waveguide and the grating coupler (e.g., through a slab waveguide section), and couples light between the rib waveguide and the grating coupler with very low loss and low back-reflection.

The improved coupling performance in operation of the circuit makes for a more efficient optical chip in use. Additionally, the improved coupling performance provides performance that allows the optical circuit to be tested in-wafer, which improves the meeting of demands of high-volume manufacturing. In one embodiment, the final optical circuit includes a fully-integrated transmitter (FIT) based on a hybrid laser, a high-speed silicon modulator, and a nitride inverted taper coupler.

Figure 1:
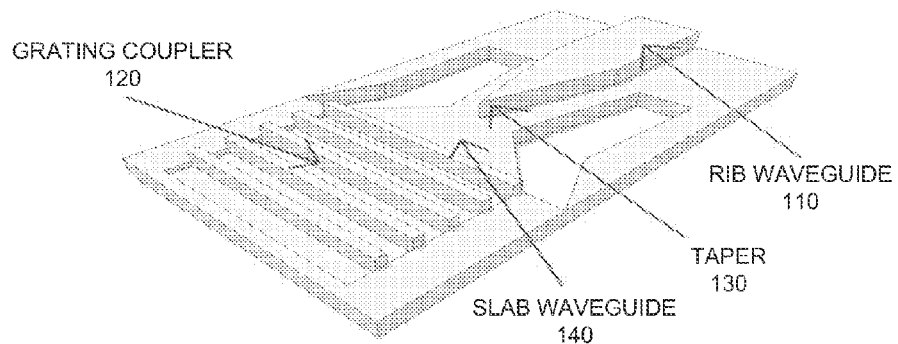
FIG. 1 is a perspective diagram of an embodiment of a grating coupler to optically interface with a tapered waveguide edge.

FIG. 1 is a perspective diagram of an embodiment of a grating coupler to optically interface with a tapered waveguide edge. Circuit 100 illustrates a portion of an integrated circuit (I/C). The I/C may be part of any of a number of devices using optical signals, such as optical transmitters and/or receivers, optical processing elements, electrical-optical or optical-electrical conversion circuits, or other devices. Similar to what is mentioned above, such optical signal devices may include devices for use in telecommunication and/or data communication, biomedical devices, bio-sensing systems, environmental sensors, gaming systems, or other areas.

As illustrated, circuit 100 includes rib waveguide 110, which may be connected to grating coupler 120 through slab waveguide 140. Rib waveguide 110 includes taper 130, which may also be referred to as an "inverted taper". For purposes of simplicity, reference wilt generally be made to a taper or a tapered edge, but will be understood that "inverted taper" could also be used to describe the tapered end between the body of rib waveguide 110 and grating coupler 120.

Rib waveguide 110 may also be referred to as a "strip" waveguide, and is generally defined as having a portion of material that has vertical edges, and a top surface above the surface of the semiconductor substrate or slab. Rib waveguide 110 has a waveguide mode, where appropriate bias and signaling is provided to cause circuit 100 to transmit and/or receive an optical signal. It will be understood that the waveguide mode is a region that is activated in an active region of circuit 100, when circuit 100 is appropriately biased. For purposes of simplicity in description, circuit 100 will be described simply as having a waveguide, without necessarily explicitly referring to the active region of the circuit. The waveguide mode in rib waveguide 110 will exist and convey an optical signal in a direction parallel to the semiconductor substrate, constrained by rib waveguide 110.

The vertical edges will generally constrain the waveguide mode and cause the photons to move along the waveguide mode in a lengthwise axis of rib waveguide 110. The top surface of rib waveguide 110 will generally constrain the waveguide mode in a vertical direction. The top surface of rib waveguide 110 will have a thickness, or a height relative to a beginning of the semiconductor substrate on which it is integrated. As mentioned above, silicon laser circuits are commonly designed with a thickness of approximately 400 nanometers. In one embodiment, semiconductor material other than silicon-on-insulator (SOI) may be used, and a different semiconductor material (such as II-V material) could be used to process the waveguides. In certain embodiments, depending on semiconductor material type and desired use of the optical circuit, other thicknesses could be used.

Grating coupler 120 is a grating region of circuit 100. The vertical structures of grating coupler 120 are perpendicular to the direction light would travel along rib waveguide 110 (going either direction). It will be observed that the structures protrude up off the semiconductor substrate in the grating region, in contrast to traditional designs that simply etch trenches into a grating region. Thus, for purposes of distinction, traditional grating designs may be referred to as "trench" grating couplers, and the structure or design presented herein may be referred to as a "fin" grating coupler. The fins extend up to the same or approximately the same height as rib waveguide 110 at the top surfaces of the fins. Thus, they may be said in one embodiment to be in the same plane as the rib waveguide. The fins may be in substantially the same plane in that the heights and/or the substrates do not necessarily have to identically align.

The fins are spaced periodically apart from each other by a spacing. In one embodiment, the spacing is approximately equal to the height of the fins. A waveguide mode will exist within the grating coupler region of circuit 100. Again, the waveguide mode exists in the active region, which will not be specifically referred to. The vertical constraints on the waveguide mode in the grating coupler region are tighter than those of rib waveguide 110. Thus, the waveguide mode in grating coupler 120 is constrained by a vertical thickness different than that of the waveguide mode of rib waveguide 110. The use of the grating coupler and the taper may be effective for vertical differences of at least ten percent or more. In one embodiment, grating coupler 120 has its highest efficiency around 200 nanometers, which is nearly 50% less than the example 400 nm of rib waveguide 110 mentioned above. In one embodiment, the thickness of slab waveguide 140 is approximately 200 nanometers.

The principal point in indicating the heights (or thicknesses or vertical constraints is in pointing out that different waveguide mode thicknesses exist between rib waveguide 110 and grating coupler 120. While examples may be described herein with reference to specific thicknesses, these should be understood as examples only, and are not limiting.

Taper 130 is included in (integrated onto or with) rib waveguide 110. While it may be described as a separate component, it will be understood that it can be produced with the same processing steps that generate rib waveguide 110. Thus, in one embodiment, taper 130 could be considered to be part of rib waveguide 110. Taper 130 tapers the outer, vertical edges of rib waveguide 110 to a narrower structure. In one embodiment, the narrower portion is the convergence of the vertical edges in a point (or rather, in a vertical line). The tapering "points" from the rib waveguide to grating coupler 120 along the horizontal axis of the direction of propagation of light in the waveguide.

Taper 130 focuses or expands light between rib waveguide 110 and grating coupler 120. The focusing of the optical mode could be considered to "squeeze" the larger waveguide mode down to the smaller one, or expand from the smaller to the larger in the reverse direction. Taper 130 may be considered to function similarly to a lens component that couples optical fibers together. In contrast to a lens, taper 130 is integrated directly onto the same semiconductor substrate as the waveguides, and exchanges optical signals on-die.

In one embodiment, circuit 100 includes slab waveguide 140, which may or may not be situated between rib waveguide 110 and grating coupler 120, or more precisely, between taper 130 and grating coupler 120. In one embodiment, the thickness of slab waveguide 140 is what provides the vertical constraint of the waveguide mode in grating coupler 120. Slab waveguide 140 is defined by the areas of the substrate that are removed to define the optical pathway between rib waveguide 110 and grating coupler 120.

The use of grating coupler 120 in combination with taper 130 allows for better matching, and thus more efficient performance, of circuit 100. The transfer from the larger to the smaller waveguide modes or from the smaller to the larger waveguide modes can reduce optical mode mismatch. Additionally, the higher efficiency removes the need to generate a singulated device with polished edges to test the functionality and characterization of circuit 100.

Figure 2:
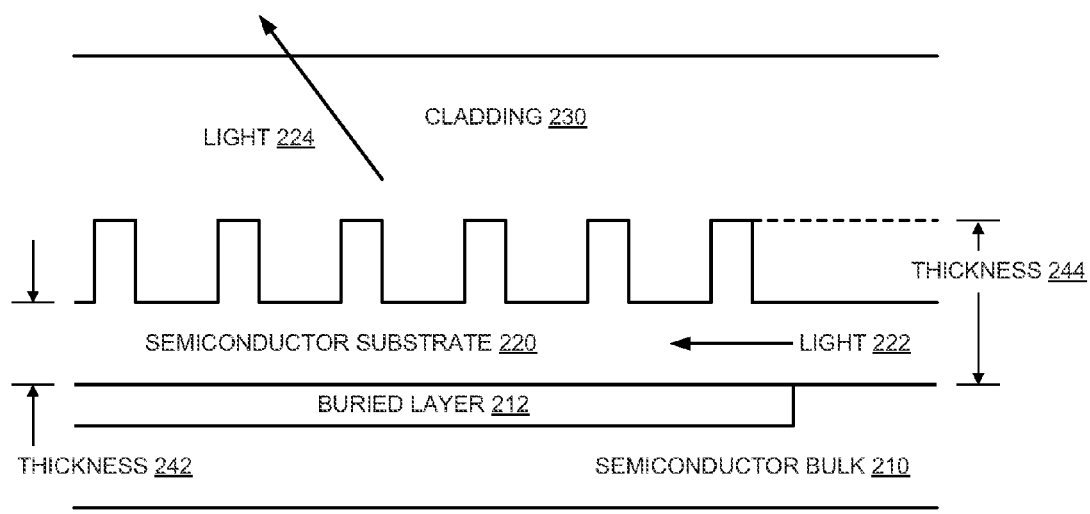
FIG. 2 is a block diagram of an embodiment of a grating coupler design.

FIG. 2 is a block diagram of an embodiment of a grating coupler design. Circuit 200 illustrates an example of a photonics circuit according to any embodiment described herein, such as circuit 100 of FIG. 1. Circuit 200 includes semiconductor bulk 210, which represents any bulk or base material on which integrated circuits are integrated. Semiconductor bulk 210 includes the wafer material on which the I/Cs are processed. It will be understood that various features illustrated in circuit 200 are not to scale, but are merely representative of features and functionality present in a photonics circuit as described herein.

Semiconductor substrate 220 represents semiconductor material that is processed onto semiconductor bulk 210. A substrate may be processed onto semiconductor bulk 210 via any known processing techniques, including depositing, growing, etching, or other techniques. In one embodiment, semiconductor substrate 220 includes silicon-on-insulator (SOI). Semiconductor substrate 220 includes a series or sequence of fins in a periodic grating connected. In one embodiment, the grating portion is connected to a slab waveguide with a taper interfacing the slab waveguide to a rib waveguide.

In an active region of circuit 200, a waveguide mode is induced within semiconductor substrate 220, which conveys light 222 from other areas of circuit 200 into the grating region for emission out the top of cladding 230 (as shown for the transmission of an optical signal). Light 222 is transferred through semiconductor substrate 220 from another area (not shown), and light 224 is emitted out through the grating coupler in a transmission mode. In accordance with what is described above, semiconductor substrate 220 has a thickness 242 (e.g., ~200 nm). Light 222 is originated in an area having a thickness 244, larger than thickness 242 (e.g., ~400 nm).

Although not shown in FIG. 2, it will be understood that in accordance with what is described herein, light 222 is generated in a region of greater thickness 244, and focused through a tapered edge to thickness 242.

In one embodiment, buried layer 212 or a deep layer is used in addition to the taper and grating coupler described herein. The deep layer is represented generically in circuit 200 as buried layer 212, and can represent anything from a double SOI substrate with a buried metal reflector processed under the grating coupler region. Alternatively, the deep layer may simply be an undercut edge that is used to remove a buried insulator layer to improve diffraction efficiency. Thus, the substrate on which the grating coupler is processed may be or include buried layer 212.

It will be understood that one advantage of the use of the taper and the grating coupler is that they can be processed with a standard etching technique. Alternatively, a silicon overlay layer may be placed over the substrate 220 (e.g., using a-Si deposition or c-Si epitaxy) and then the grating coupler is defined on it. With such implementations, the geometric similarity between the superstrate and the substrate is lifted, which may enhance the power scattered into the superstrate. The use of a metallic film such as gold (Au) or aluminum (Al) beneath the grating coupler allows the device to reflect optical signals back up to the superstrate. Under a suitable constructive interference condition, the power scattered into the superstrate is enhanced.

The use of the taper and grating coupler described herein does not introduce the increased processing complexity, but may enhance the performance in the circumstance that one of the techniques is used.

Figure 3A:
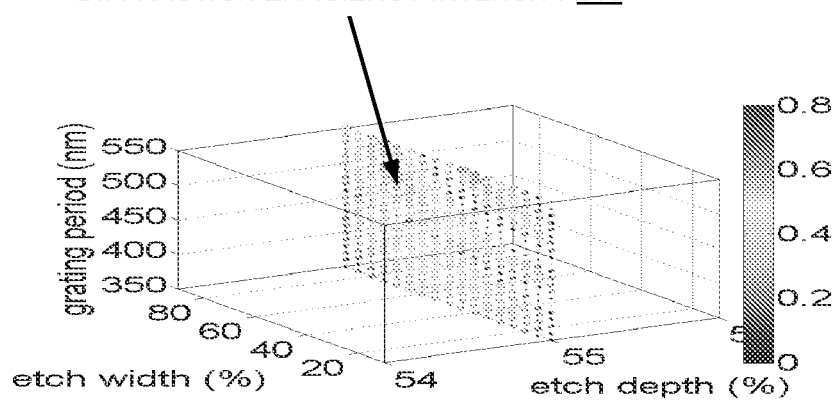
FIGS. 3A-3B illustrate an embodiment of a comparison of grating coupler diffraction efficiency.
Figure 3B:
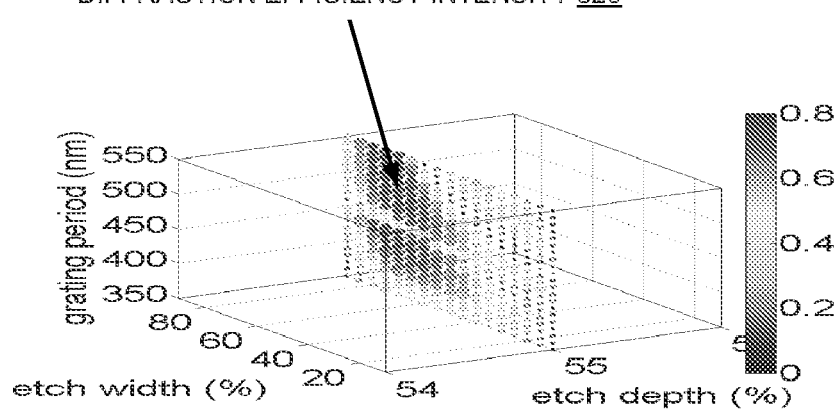

FIGS. 3A-3B illustrate an embodiment of a comparison of grating coupler diffraction efficiency. Both figures provide illustrations of diffraction (toward the superstrate) efficiency as a function of etch depth, etch width, and grating period. The efficiency is plotted from simulations of a traditional circuit having a "trench" grating coupler on 501 in FIG. 3A, and a circuit having a "fin" grating coupler and a tapered edge on SOI as described herein in FIG. 3B. In both figures, the top oxide cladding is assumed to be 1 μm thick, the etch width is normalized by the grating period, and the etch depth is normalized by 400 nm.

In FIG. 3A, at optimum operation points showing diffraction efficiency intensity 310, the device features are approximately −2.5 dB insertion loss (where darker shading shows increased efficiency). Simulations show that the maximum diffraction efficiency is 56% and the corresponding back-reflection is 11%.

In FIG. 3B, at optimum operation points showing diffraction efficiency intensity 320, the device features are approximately −1.9 dB insertion loss, which is better than the best grating couplers reported with metal reflector embedded in the substrate. Simulations show a maximum diffraction efficiency of 76%, and a corresponding very low back-reflection is 0.4%.

Observation of the issues of low diffraction efficiency and strong back-reflection indicate that there is large mode mismatch between the waveguide region and the grating region that causes undesired scattering. Thus, with use of the tapered edge as described herein to reduce the input waveguide height to approximately 200 nm, the mode mismatch is largely eliminated between the two regions.

Figure 4A:
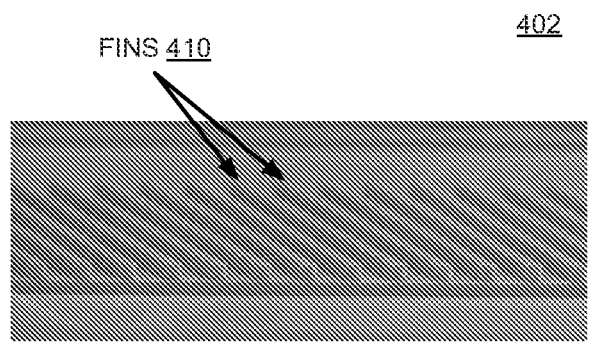
FIGS. 4A-4B illustrate an embodiment of fabricated periodic grating coupler and inverted taper designs, respectively.
Figure 4B:
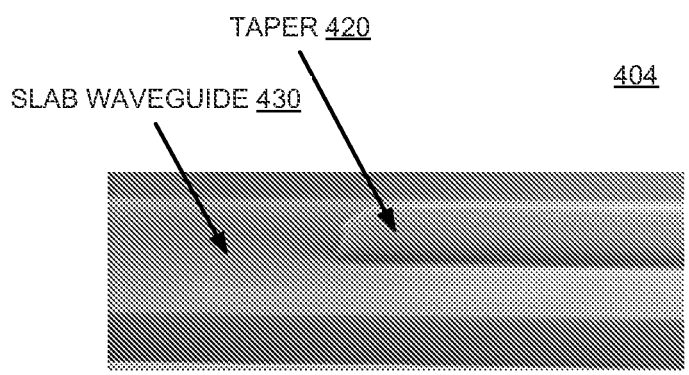

FIGS. 4A-4B illustrate an embodiment of fabricated periodic grating coupler and inverted taper designs, respectively. FIG. 4A illustrates an example of a fabricated periodic grating. Grating 402 includes fins 410. Unlike putting a silicon overlay layer and then defining the grating region, grating 402 with fins 410 only requires several lithographic steps to fabricate, and is compatible with commonly used fabrication processes.

FIG. 4B illustrates an example of a fabricated inverted taper structure on a rib waveguide. Circuit 404 is illustrated with taper 420 connecting a rib waveguide to slab waveguide 430. Taper 420 adiabatically transfers the vertical mode size between the size of the rib waveguide and the size of the grating region waveguide (e.g., 400 nm and 200 nm, respectively). In one embodiment, the structures can be designed with only two lithographic masks. Thus, in one embodiment the rib waveguide, inverted-taper, and periodic grating are created in one step of 200 nm etch, and the slab waveguide is defined with an additional step of 200 nm etch to reach buried oxide in an SOI system.

The fabricated structures were measured for grating coupler performance by using single-mode fiber (SMF). Total coupling loss (calculated as diffraction efficiency times the SMF coupling efficiency) was 3 dB, and the 3 dB bandwidth was 60 nm, which was very comparable to predictions from simulations. The spectral fringe contrast was 0.04 dB and corresponded to 27 dB of back-reflection.

Figure 5A:
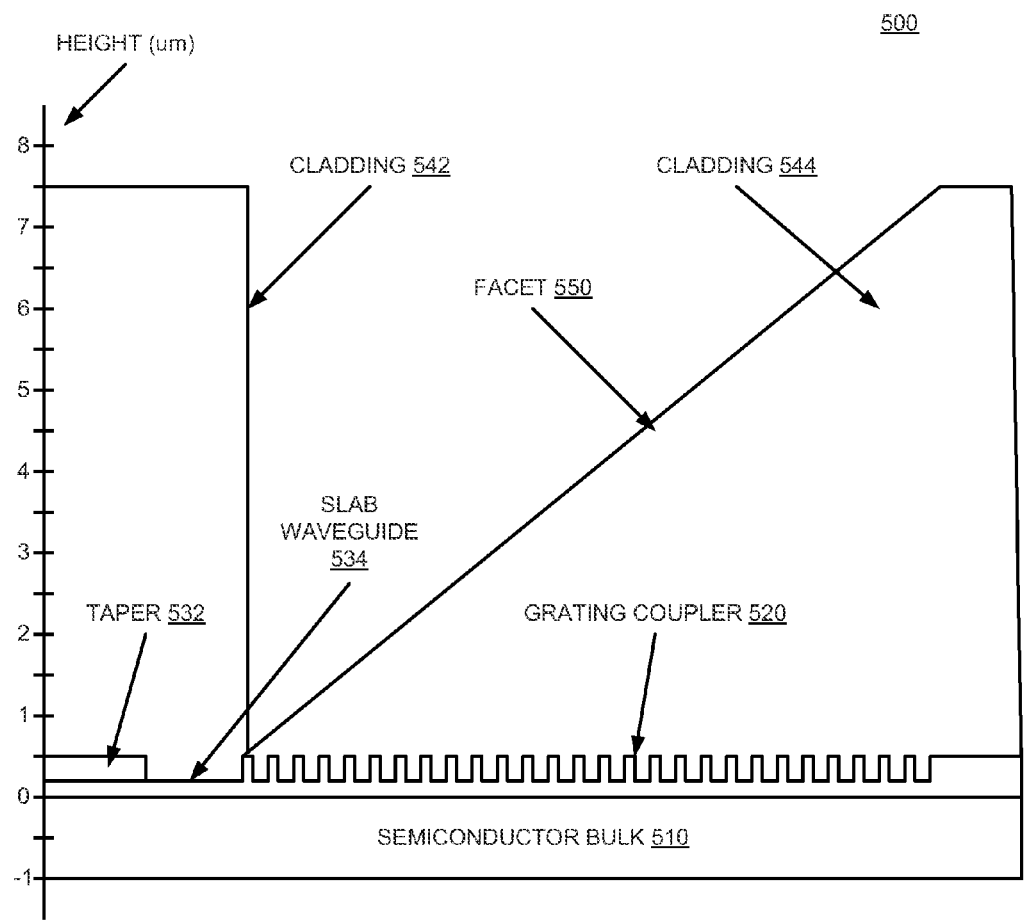
FIGS. 5A-5B are block diagrams of embodiments of a grating coupler with a sloped cladding.

FIG. 5A is a block diagram of an embodiment of a grating coupler with a sloped cladding. Circuit 500 is part of an optical integrated circuit, and includes semiconductor bulk 510 on which grating coupler 520, taper 532, and slab waveguide 534 are integrated. The use of the grating coupler with an inverted taper are discussed above and a detailed discussion of those elements is not repeated here.

Circuit 500 also includes cladding 542 above the circuit to provide optical interchange for the optical I/C. In one embodiment, cladding 542 is sloped to provide a vertical emission of light from circuit 500. Typically, the emission of light from circuit 500 would not be vertical if cladding 542 were planar as is typically done. Thus, cladding 542 is illustrated with facet 550, which slopes vertically up and horizontally away from the direction of the optical mode in transmission in circuit 500. Thus, light is emitted from taper 532 into grating coupler 520. Facet 550 is at its lowest level above taper 532, and slopes up to the end of the grating region furthest from taper 532.

Figure 5B:
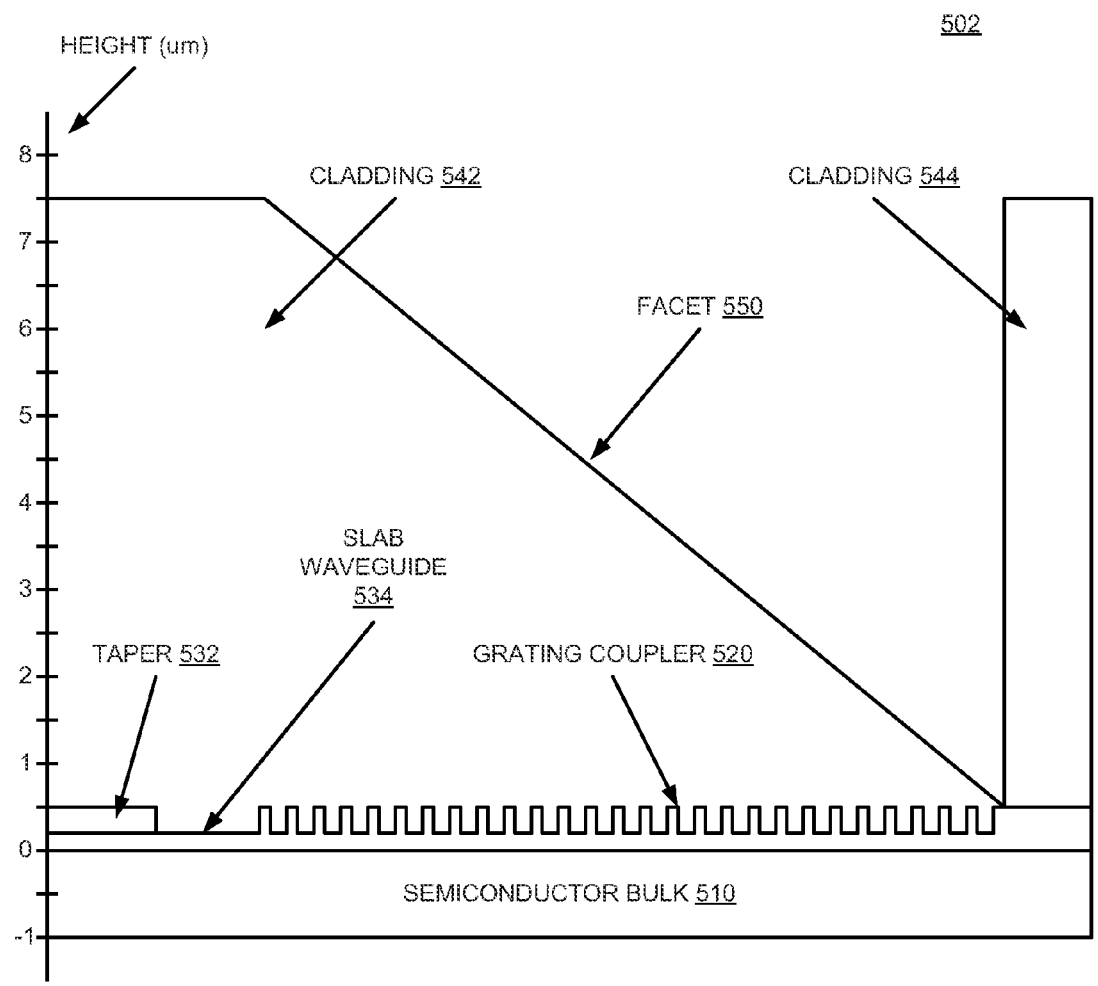

In one embodiment, facet 550 is sloped vertically down instead of vertically up, as illustrated in circuit 502 of FIG. 5B. Whether facet 550 is sloped up or down depends on the designed emission directions of grating coupler 520.

Cladding 544 illustrates other cladding that covers circuit 500. Facet 550 is provided directly over grating coupler 520 to direct emitted light in a vertical direction (i.e., substantially perpendicular to semiconductor bulk 510). It will be observed that the height requirement for a single facet 550 is more than 7 microns of cladding.

Figure 6A:
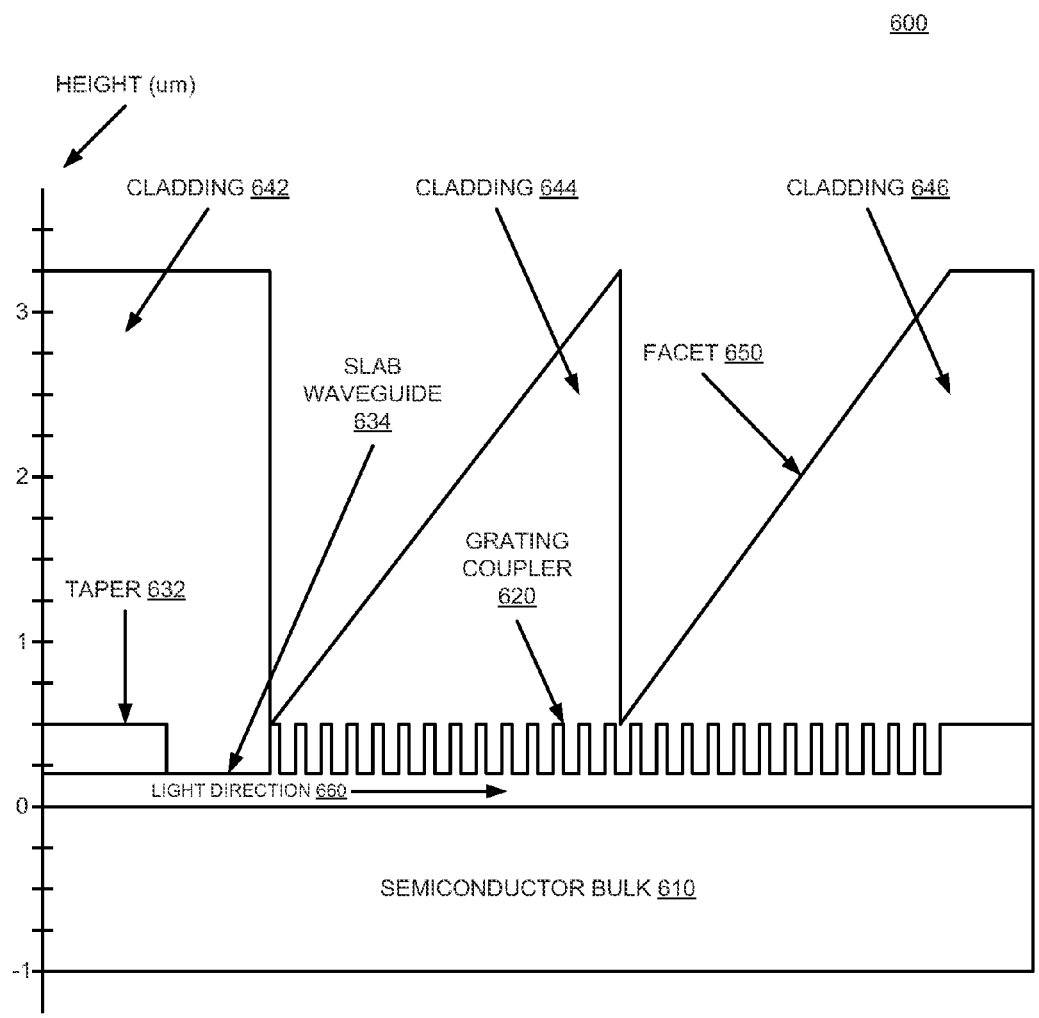
FIGS. 6A-6B are block diagrams of embodiments of a grating coupler with successive facets of sloped cladding.

FIG. 6A is a block diagram of an embodiment of a grating coupler with successive facets of sloped cladding. Given the difficulty in achieving a uniform-quality cladding at 7 microns thickness, it may be desirable to use multiple facets as illustrated with circuit 600.

Figure 6B:
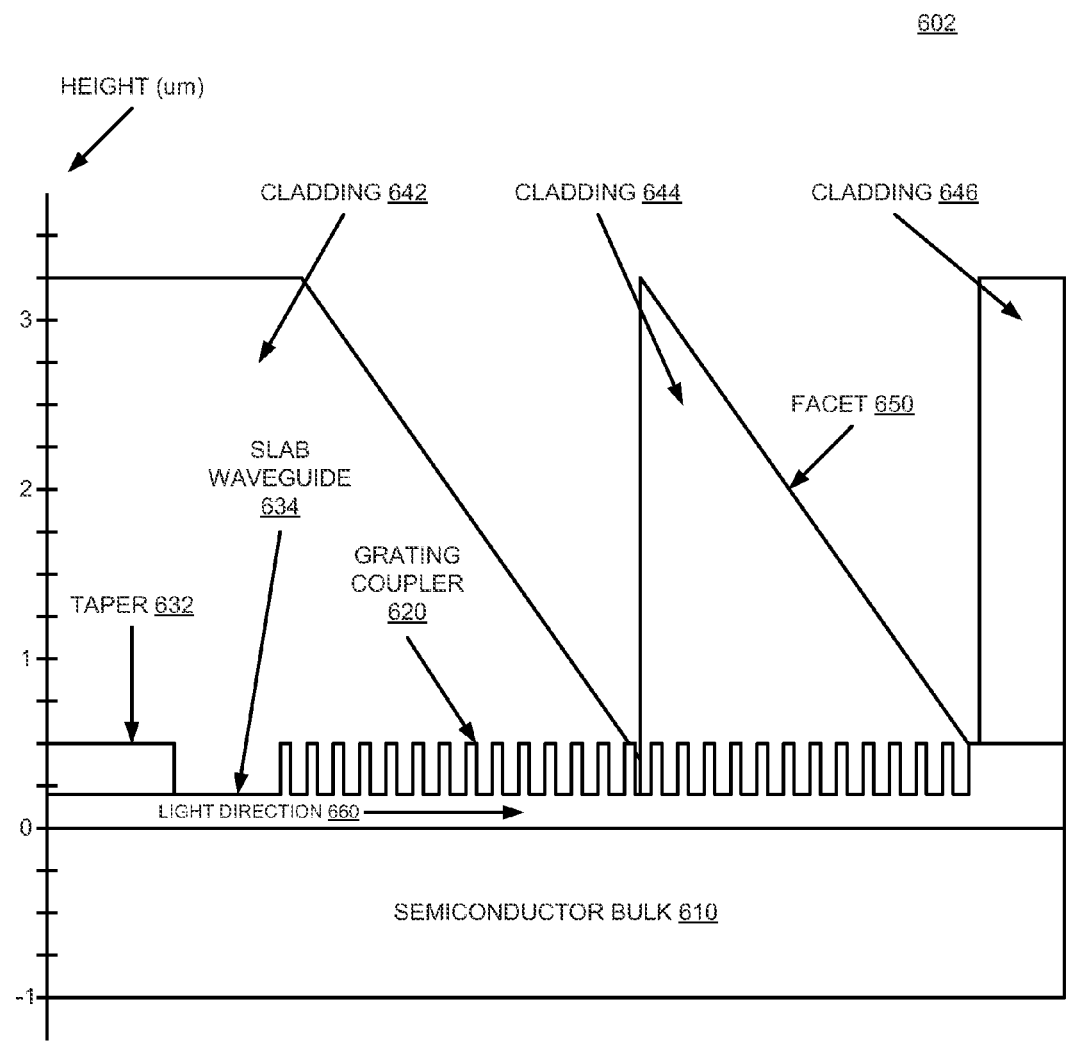

Circuit 600 includes semiconductor bulk 610, on which grating coupler 620, taper 632, and slab waveguide 634 may be integrated. The cladding of circuit 600 is separated as shown into segments 642, 644, and 646 to expose multiple facets 650. The facets in the cladding allow for vertical emission of light, but the height requirement is much lower, at approximately 3 microns. Facets 650 slope vertically up and horizontally away from taper 632 in the direction of light 660 for transmission of light from circuit 600. Similar to what is described above with respect to FIG. 5, facets 650 may alternatively slope vertically down and horizontally away from taper 632, as illustrated in circuit 602 of FIG. 6B.

Figure 7:
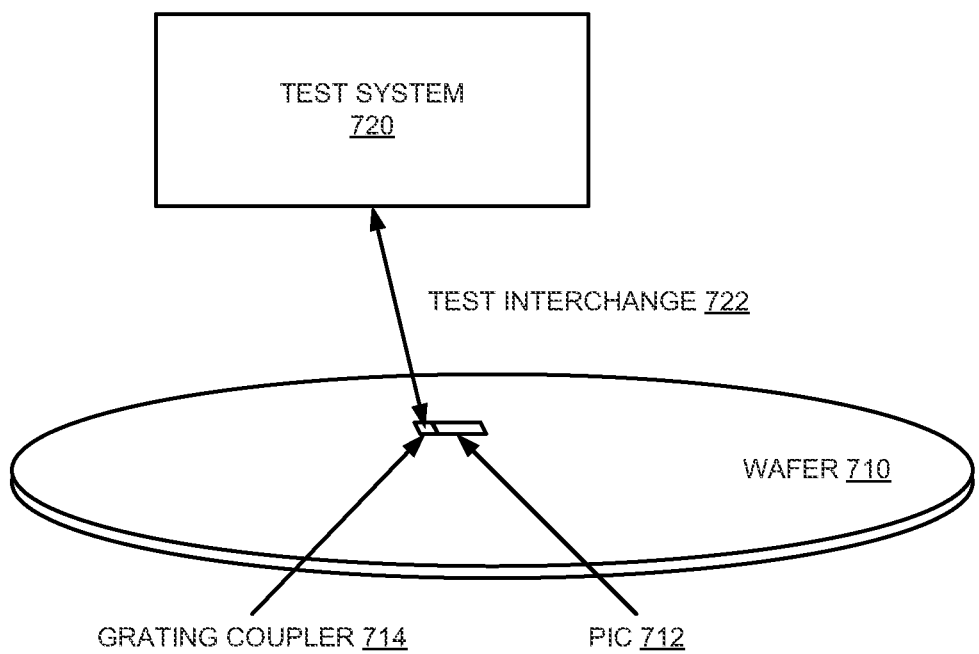
FIG. 7 is a block diagram of an embodiment of a test system for a wafer with optical circuits having integrated tapered edge and grating coupler components.

FIG. 7 is a block diagram of an embodiment of a test system for a wafer with optical circuits having integrated tapered edge and grating coupler components. System 700 illustrates wafer 710, which includes at least one photonic integrated circuit (PIC) 712. It will be understood that PIC 712 is not drawn to scale for wafer 710. PIC 712 includes grating coupler 714 that receives focused tight from an inverted taper for transmission of light out of the PIC.

Test system 720 represents test equipment that could be used to verify the functionality of PIC 712. Test system 720 specifically can test PIC 712 in-wafer, rather than having to separate individual chips from wafer 710 prior to testing the circuit, which can save substantial processing/testing costs. Test system 720 includes an optical test circuit that tests PIC 712 via grating coupler 714 from wafer 710.

For example, PIC 712 may generate and transmit a test signal out of grating coupler 714, which could be tested for direction and intensity, as well as signal integrity. In one embodiment, test system 720 includes an optical fiber that interfaces with PIC 712 to test the coupling of the device with a fiber, as might be expected from the circuit in a practical application. Test interchange 722 represents any exchange of optical signals between PIC 712 and test system 720.

Figure 8:
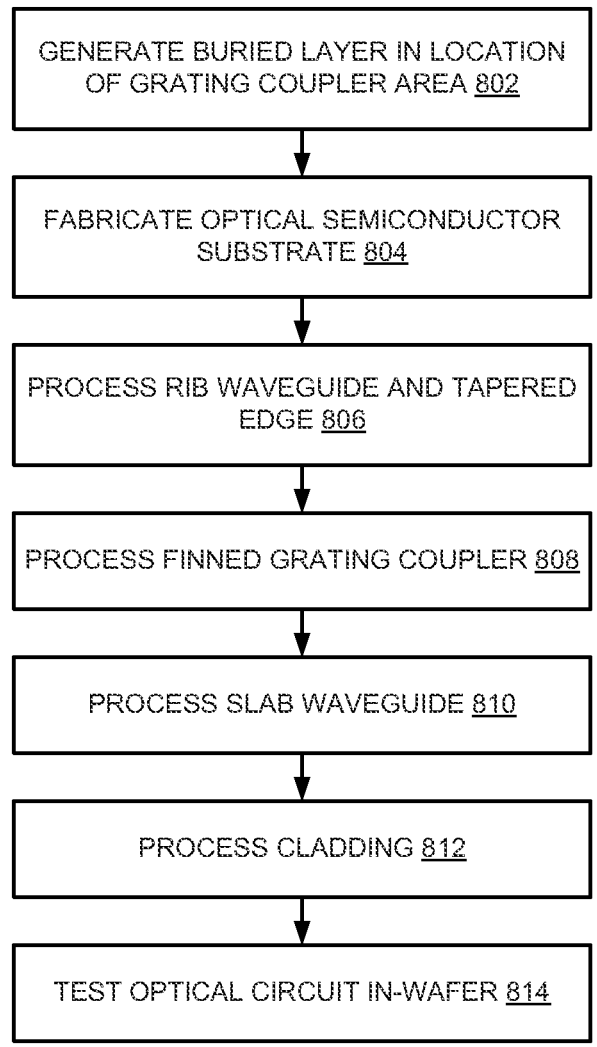
FIG. 8 is a flow diagram of an embodiment of a process for generating and testing an optical circuit having integrated tapered edge and grating coupler components.

FIG. 8 is a flow diagram of an embodiment of a process for generating and testing an optical circuit having integrated tapered edge and grating coupler components. Flow diagrams as illustrated herein provide examples of sequences of various process actions. Although shown in a particular sequence or order, unless otherwise specified, the order of the actions can be modified. Thus, the illustrated implementations should be understood only as an example, and the process can be performed in a different order, and some actions may be performed in parallel. Additionally, one or more actions can be omitted in various embodiments of the invention; thus, not all actions are required in every implementation. Other process flows are possible.

In one embodiment, a buried layer, or a double SOI layer (DSOI) is used for grating coupler efficiency. If such a layer is used, the semiconductor substrate may need to be prepared prior to processing the grating coupler onto the substrate. An additional layer may not be made in all cases. If an additional layer is used, the semiconductor substrate may be processed to generate a buried layer in a location of the grating coupler area, 802. The buried layer may be a buried SOI layer. The buried layer may be a buried metal reflector layer.

In one embodiment, a buried oxide layer is removed from the semiconductor substrate, which can also improve performance of the grating coupler. Thus, in one embodiment, a buried insulator layer is removed via an undercut etch, typically via wet etch.

The processing of a photonics die as described herein includes fabricating an optical semiconductor substrate, 804. Some wafers may be pre-prepared for optical die processing. The processing of the die continues on a prepared wafer by processing a rib or strip waveguide on the semiconductor substrate, 806. In one embodiment, part of processing the rib waveguide onto the semiconductor substrate includes processing a tapered edge on the rib waveguide that "points" to the grating coupler area, 806. In one embodiment, processing the tapered edge is accomplished via a separate processing operation.

The processing of the photonics die continues by processing a finned grating coupler on the semiconductor substrate in the grating coupler area, 808. The processing of the photonics die continues by processing the slab waveguide, 810. The slab waveguide is formed by etching out its shape, which focuses the light from the rib waveguide into the grating region. As one example, consider the perspective view of FIG. 1 that shows an active region in the substrate defined by a structure formed by removing substrate material from around the rib waveguide and between the rib waveguide toward the grating region. The generating of the photonics die may be finished by processing cladding onto the photonics die, 812. In one embodiment, testing is performed by the organization that performs the processing of the photonics die on the wafer, the testing is done on-wafer, 814. In one embodiment, the processing of the cladding onto the photonics die may include processing one or more sloped facets into the cladding over the grating region.

Various operations or functions are described herein, which may be described or defined as software code, instructions, configuration, and/or data. The content may be directly executable ("object" or "executable" form), source code, or difference code ("delta" or "patch" code). The software content of the embodiments described herein may be provided via an article of manufacture with the content stored thereon, or via a method of operating a communications interface to send data via the communications interface. A machine readable medium or computer readable medium may cause a machine to perform the functions or operations described, and includes any mechanism that provides stores and/or transmits) information in a form accessible by a machine e.g., computing device, electronic system, or other device), such as via recordable/non-recordable storage media (e.g., read only memory (ROM), random access memory (RAM), magnetic disk storage media, optical storage media, flash memory devices, or other storage media) or via transmission media (e.g., optical, digital, electrical, acoustic signals or other propagated signal). A communication interface includes any mechanism that interfaces to any of a hardwired, wireless, optical, or other medium to communicate to another device, such as a memory bus interface, a processor bus interface, an Internet connection, a disk controller. The communication interface can be configured by providing configuration parameters and/or sending signals to prepare the communication interface to provide a data signal describing the software content.

Various components described herein may be a means for performing the operations or functions described. Each component described herein includes software, hardware, or a combination of these. The components can be implemented as software modules, hardware modules, special-purpose hardware (e.g., application specific hardware, application specific integrated circuits (ASIC), digital signal processors (DSPs), etc.), embedded controllers, hardwired circuitry, etc.

Besides what is described herein, various modifications may be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:

1. An apparatus comprising:
a silicon-based rib waveguide integrated on a semiconductor substrate including a silicon-on-insulator (SOI) substrate, the rib waveguide to have a first waveguide mode in a direction parallel to a plane of the semiconductor substrate, the first waveguide mode to be vertically constrained by a thickness of the rib waveguide and a thickness of the semiconductor substrate, the first waveguide mode to exist in the rib waveguide and semiconductor substrate vertically below the rib waveguide;
a silicon-based grating coupler integrated on the semiconductor substrate, the grating coupler having multiple vertical fins periodically spaced in a same plane as the rib waveguide, each vertical fin being substantially perpendicular to a direction of the first waveguide mode, the grating coupler to have a second waveguide mode in a direction parallel to a plane of the semiconductor substrate, the second waveguide mode to be vertically constrained by a second thickness at least ten percent smaller than the thickness of the rib waveguide; and
a tapered edge tapering the rib waveguide toward the grating coupler, the tapered edge to focus light to convert from the first waveguide mode to the second waveguide mode.

2. The apparatus of claim 1, wherein the grating coupler has a buried insulator removed via an undercut etch.

3. The apparatus of claim 1, wherein the thickness of the rib waveguide is approximately 400 nanometers, and the second thickness is a thickness of approximately 200 nanometers of a slab waveguide between the tapered edge and the grating coupler.

4. The apparatus of claim 1, wherein the semiconductor substrate comprises a double SOI.

5. The apparatus of claim 4, wherein the grating coupler has a buried insulator removed via an undercut etch.

6. The apparatus of claim 1, wherein the semiconductor substrate comprises a buried metal reflector.

7. The apparatus of claim 1, further comprising:
a sloped cladding located vertically above the grating coupler, the sloped cladding having a facet sloping vertically up and horizontally away from the tapered edge in the direction of the first waveguide mode.

8. The apparatus of claim 6, wherein the sloped cladding includes multiple successive facets sloping vertically up and horizontally away from the tapered edge in the direction of the first waveguide mode.

9. The apparatus of claim 1, further comprising:
a sloped cladding located vertically above the grating coupler, the sloped cladding having a facet sloping vertically down and horizontally away from the tapered edge in the direction of the first waveguide mode.

10. The apparatus of claim 9, wherein the sloped cladding includes multiple successive facets sloping vertically down and horizontally away from the tapered edge in the direction of the first waveguide mode.

11. A system comprising:
a semiconductor die including a photonic integrated circuit including
a silicon-based rib waveguide integrated on a semiconductor substrate including a silicon-on-insulator (SOI) substrate, the rib waveguide to have a first waveguide mode in a direction parallel to a plane of the semiconductor substrate, the first waveguide mode to be vertically constrained by a thickness of the rib waveguide and a thickness of the semiconductor substrate, the first waveguide mode to exist in the rib waveguide and semiconductor substrate vertically below the rib waveguide;
a silicon-based grating coupler integrated on the semiconductor substrate, the grating coupler having multiple vertical fins periodically spaced in a same plane as the rib waveguide, each vertical fin being substantially perpendicular to a direction of the first waveguide mode, the grating coupler to have a second waveguide mode in a direction parallel to a plane of the semiconductor substrate, the second waveguide mode to be vertically constrained by a second thickness at least ten percent smaller than the thickness of the rib waveguide; and
a tapered edge tapering the rib waveguide toward the grating coupler, the tapered edge to focus light to convert from the first waveguide mode to the second waveguide mode; and
an optical test circuit to test the photonic integrated circuit via the grating coupler while the die is on a wafer.

12. The system of claim 11, wherein the semiconductor substrate comprises a double SOI.

13. The system of claim 11, wherein the thickness of the rib waveguide is approximately 400 nanometers, and the second thickness is a thickness of approximately 200 nanometers of a slab waveguide between the tapered edge and the grating coupler.

14. The system of claim 11, wherein the semiconductor substrate comprises a buried metal reflector.

15. The system of claim 11, further comprising:
a sloped cladding located vertically above the grating coupler, the sloped cladding having a sloped facet.

16. A method comprising:
integrating a silicon-based rib waveguide on a semiconductor substrate, the semiconductor substrate including a silicon-on-insulator substrate, the rib waveguide to have a first waveguide mode in a direction parallel to a plane of the semiconductor substrate, the first waveguide mode to be vertically constrained by a thickness of the rib waveguide and a thickness of the semiconductor substrate, the first waveguide mode to exist in the rib waveguide and semiconductor substrate vertically below the rib waveguide;

integrating a silicon-based grating coupler on the semiconductor substrate, including forming multiple vertical fins periodically spaced in a same plane as the rib waveguide, each vertical fin being substantially perpendicular to a direction of the first waveguide mode, the grating coupler to have a second waveguide mode in a direction parallel to a plane of the semiconductor substrate, the second waveguide mode to be vertically constrained by a second thickness at least ten percent smaller than the thickness of the rib waveguide; and integrating a tapered edge tapering the rib waveguide toward the grating coupler, the tapered edge to focus light to convert from the first waveguide mode to the second waveguide mode.

17. The method of claim 16, wherein integrating the grating coupler on the semiconductor substrate comprises integrating the grating coupler onto a double SOI substrate.

18. The method of claim 16, further comprising:
integrating a sloped cladding vertically above the grating coupler, the sloped cladding having a sloped facet.

19. The method of claim 16, further comprising:
testing the optical mode via the grating coupler while the semiconductor die is on a processed wafer.

* * * * *

UNITED STATES PATENT AND TRADEMARK OFFICE
CERTIFICATE OF CORRECTION

| | | |
|---|---|---|
| PATENT NO. | : 8,625,942 B2 | Page 1 of 1 |
| APPLICATION NO. | : 13/075949 | |
| DATED | : January 7, 2014 | |
| INVENTOR(S) | : Na et al. | |

It is certified that error appears in the above-identified patent and that said Letters Patent is hereby corrected as shown below:

Please insert in column 1, line 5 before BACKGROUND:

--STATEMENT OF GOVERNMENT INTEREST

This invention was made with Government support under contract number H98230-08-3-0011 awarded by the Department of Defense. The Government has certain rights in this invention.--

Signed and Sealed this
First Day of December, 2015

Michelle K. Lee
*Director of the United States Patent and Trademark Office*